United States Patent [19]

Oyanagi

[11] Patent Number: 5,438,645
[45] Date of Patent: Aug. 1, 1995

[54] NEURAL NETWORK WHICH USES A MONITOR

[75] Inventor: Shigeru Oyanagi, Yokohama, Japan

[73] Assignee: Kabushiki Kaisha Toshiba, Kawasaki, Japan

[21] Appl. No.: 618,884

[22] Filed: Nov. 28, 1990

[30] Foreign Application Priority Data

Nov. 28, 1989 [JP] Japan .................................. 1-306510

[51] Int. Cl.6 .............................................. G06F 15/18
[52] U.S. Cl. ........................................ 395/24; 395/23
[58] Field of Search .................. 364/513, 807; 395/24, 395/23, 27

[56] References Cited

U.S. PATENT DOCUMENTS

| | | | |
|---|---|---|---|
| 3,103,648 | 8/1961 | Hartmanis | 364/513 |
| 3,308,441 | 7/1963 | Dusheck, Jr. | 364/513 |
| 3,348,214 | 6/1965 | Barbetta | 364/513 |
| 3,950,733 | 4/1976 | Cooper et al. | 364/513 |
| 4,651,239 | 3/1987 | Andes et al. | 364/513 |
| 4,660,166 | 4/1987 | Hopfield | 364/807 |
| 4,807,168 | 2/1989 | Moopenn et al. | 364/513 |
| 4,858,147 | 8/1989 | Conwell | 364/148 |
| 4,866,645 | 9/1989 | Lish | 364/131 |
| 4,912,655 | 5/1990 | Wood | 364/513 |
| 4,926,064 | 5/1990 | Tapang | 364/513 |
| 4,943,931 | 7/1990 | Allen | 364/513 |
| 4,947,482 | 8/1990 | Brown | 364/807 |
| 4,951,239 | 8/1990 | Andes et al. | 364/513 |
| 5,014,219 | 5/1991 | White | 364/513 |
| 5,016,211 | 5/1991 | Jeong | 364/786 |
| 5,023,045 | 6/1991 | Watanabe et al. | 364/148 |
| 5,033,006 | 7/1991 | Ishizuka et al. | 364/513 |
| 5,045,713 | 9/1991 | Shima | 395/24 |
| 5,056,037 | 10/1991 | Eberhardt | 395/24 |
| 5,107,454 | 4/1992 | Niki | 395/24 |
| 5,195,169 | 3/1993 | Kamiya et al. | 395/23 |

FOREIGN PATENT DOCUMENTS 0294116 12/1988 European Pat. Off. .

OTHER PUBLICATIONS

"Neural Computing, Theory and Practice" Wasserman et al, Apr. 1989.
"Design of a Neural-Based A/D Convertor Using Modified Hopfield Network", Lee et al, IEEE Journal of Solid-State Circuits, Aug. 24, 1989.
"Back-Propagation Learning and Nonidealities in Analog Neural Network Hardware" Frye et al, Transaction on Neural Network, Jan. 1991.
"Neural Network, part 2" IEEE Expert, Wassermann et al, 1988.

(List continued on next page.)

*Primary Examiner*—Allen R. MacDonald
*Assistant Examiner*—George Davis
*Attorney, Agent, or Firm*—Oblon, Spivak, McClelland, Maier & Neustadt

[57] ABSTRACT

A neural network includes a monitor circuit for monitoring an output value of each neuron and a weighting calculation circuit for calculating a weighting between neurons in accordance with designation from the monitor circuit in order to determine the weightings between the neurons in accordance with an energy function expressed in the form of a sum of a constrain condition and an evaluation function. The monitor circuit monitors the output values of the neurons and transmits, to the weighting calculation circuit, information representing an unsatisfactory state in which a distribution of the output values does not satisfy the constrain condition. The weighting calculation circuit changes the weightings between the neurons, e.g., doubles the weightings, every time it receives this information.

15 Claims, 8 Drawing Sheets

OTHER PUBLICATIONS

"Neural Selective Processing and learning", Patrice Gelband and Edison Tse, IEEE Inter. Conf. on Neural Networks, Jul. 1988, pp. I-417-I-424.

"Computing with Neural Circuits: A Model", John J. Hopfield and David W. Tank, Aug. 1986.

IEEE Transactions on Information Theory vol. 35, No. 2, Mar. 1989, New York US pp. 263-280, "Classification Performance of Hopfield Neural Network Based on Hebbian-like Learning Rule".

The 15th Conference of Electrical & Electronics Engineers in Israel 7 Apr. 1987, Tel Aviv, Israel pp. 1-3, "A Training Algorithm for Neural Network".

Neural Networks from Models to Applications, E.S.P.-C.I. 1988, Paris, France pp. 207-216, "Training Recurrent Networks".

Biological Cybernetics, vol. 52, pp. 141-152 "Neural Computation of Decisions in Optimization Problems": Hopfield and Tank; 1985.

Proceedings of the National Academy of Sciences 79:2544-2558 "Neural Networks and Physical Systems with Emergent Collective Computational Abilities", 1982 J. J. Hopfield, pp. 460-464.

Proceedings of the National Academy of Sciences 81:3088-3092 "Neurons with Graded Response have Collective Computational Properties like those of Two-State Neurons", 1984 J. J. Hopfield, pp. 579-583.

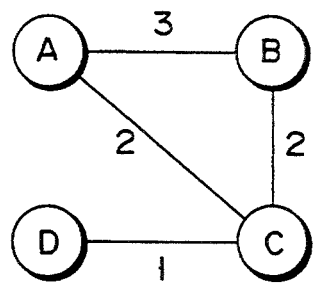
F I G. 1
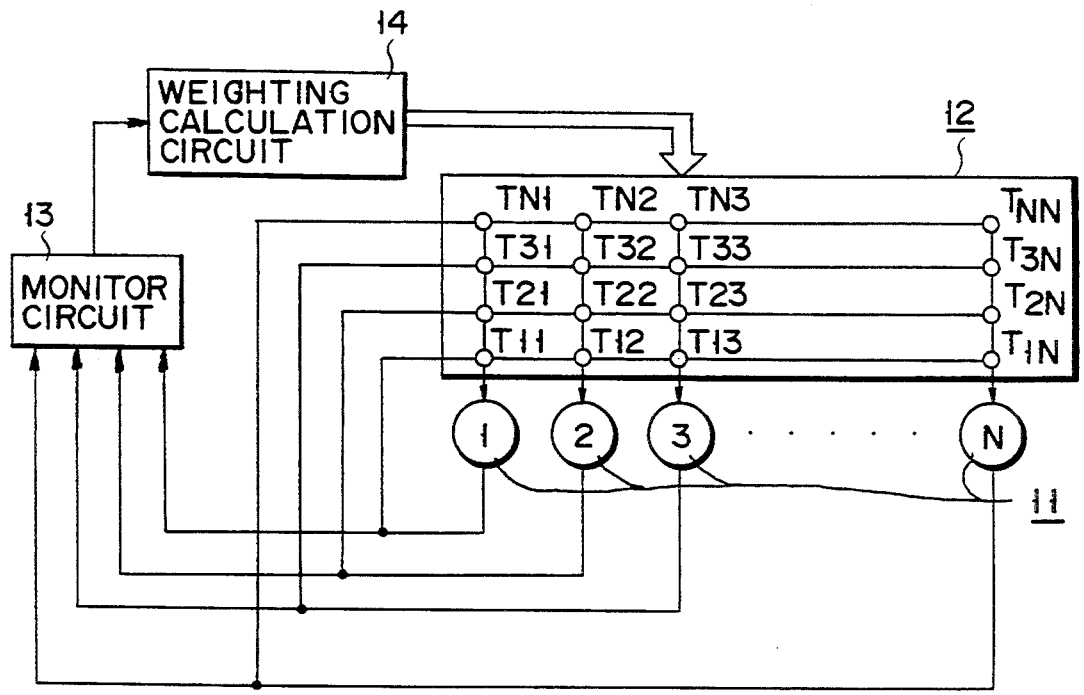
F I G. 2

$$K1 = 2 \quad K2 = 0.5 \quad T = 2\begin{bmatrix} 0 & 3 & 2 & 0 \\ 3 & 0 & 2 & 0 \\ 2 & 2 & 0 & 1 \\ 0 & 0 & 1 & 0 \end{bmatrix} - \begin{bmatrix} 0 & 1 & 1 & 1 \\ 1 & 0 & 1 & 1 \\ 1 & 1 & 0 & 1 \\ 1 & 1 & 1 & 0 \end{bmatrix} = \begin{bmatrix} 0 & 5 & 3 & -1 \\ 5 & 0 & 3 & -1 \\ 3 & 3 & 0 & 1 \\ -1 & -1 & 1 & 0 \end{bmatrix}$$

INITIAL VALUE (1 -1 1 -1)

$i = 1$ : $\Sigma T1jVj = (0\ 5\ 3\ -1)(1\ -1\ 1\ -1) = -1$
$\qquad V1 = -1 \qquad V = (-1\ -1\ 1\ -1)$ $i = 2$ : $\Sigma T2jVj = (5\ 0\ 3\ -1)(-1\ -1\ 1\ -1) = -1$
$\qquad V2 = -1 \qquad V = (-1\ -1\ 1\ -1)$ $i = 3$ : $\Sigma T3jVj = (3\ 3\ 0\ 1)(-1\ -1\ 1\ -1) = -7$
$\qquad V3 = -1 \qquad V = (-1\ -1\ -1\ -1)$ $i = 4$ : $\Sigma T4jVj = (-1\ -1\ 1\ 0)(-1\ -1\ -1\ -1) = 1$
$\qquad V4 = 1 \qquad V = (-1\ -1\ -1\ 1)$ $i = 1$ : $\Sigma T1jVj = (0\ 5\ 3\ -1)(-1\ -1\ -1\ 1) = -9$
$\qquad V1 = -1 \qquad V = (-1\ -1\ -1\ 1)$ $i = 2$ : $\Sigma T2jVj = (5\ 0\ 3\ -1)(-1\ -1\ -1\ 1) = -9$
$\qquad V2 = -1 \qquad V = (-1\ -1\ -1\ 1)$ $i = 3$ : $\Sigma T3jVj = (3\ 3\ 0\ 1)(-1\ -1\ -1\ 1) = -5$
$\qquad V3 = -1 \qquad V = (-1\ -1\ -1\ 1)$

FIG. 4A $$K1=2 \quad\quad T=\ 2\begin{bmatrix}0&3&2&0\\3&0&2&0\\2&2&0&1\\0&0&1&0\end{bmatrix}-2\begin{bmatrix}0&1&1&1\\1&0&1&1\\1&1&0&1\\1&1&1&0\end{bmatrix}=\begin{bmatrix}0&4&2&-2\\4&0&2&-2\\2&2&0&0\\-2&-2&0&0\end{bmatrix}$$
$$K2=1$$

INITIAL VALUE (-1 -1 -1 1)

i = 1 : ΣT1jVj=( 0 4 2 -2 )(-1 -1 -1 1 )=-8
V1=-1    V=( -1 -1 -1 1 )

i = 2 : ΣT2jVj=( 4 0 2 -2 )(-1 -1 -1 1 )=-8
V2=-1    V=( -1 -1 -1 1 )

i = 3 : ΣT3jVj=( 2 2 0 0 )(-1 -1 -1 1 )=-4
V3=-1    V=( -1 -1 -1 1 )

i = 4 : ΣT4jVj=(-2 -2 0 0 )(-1 -1 -1 1 )= 4
V4 = 1    V=( -1 -1 -1 1 )

F I G. 4B $$K1=2 \quad\quad T=2\begin{bmatrix}0&3&2&0\\3&0&2&0\\2&2&0&1\\0&0&1&0\end{bmatrix}-4\begin{bmatrix}0&1&1&1\\1&0&1&1\\1&1&0&1\\1&1&1&0\end{bmatrix}=\begin{bmatrix}0&2&0&-4\\2&0&0&-4\\0&0&0&-2\\-4&-4&-2&0\end{bmatrix}$$
$$K2=2$$

INITIAL VALUE (-1 -1 -1 1)

i = 1 : ΣT1jVj=( 0 2 0 -4 )(-1 -1 -1 1 )=-6
V1=-1    V=(-1 -1 -1 1 )

i = 2 : ΣT2j j=( 2 0 0 -4 )(-1 -1 -1 1 )=-6
V2=-1    V=(-1 -1 -1 1 )

i = 3 : ΣT3jVj=( 0 0 0 -2 )(-1 -1 -1 1 )=-2
V3=-1    V=( -1 -1 -1 1 )

i = 4 : ΣT4jVj=(-4 -4 -2 0 )(-1 -1 -1 1 )=10
V4 = 1    V = (-1 -1 -1 1 )

F I G. 4C $$K1 = 2 \quad T = 2\begin{bmatrix} 0 & 3 & 2 & 0 \\ 3 & 0 & 2 & 0 \\ 2 & 2 & 0 & 1 \\ 0 & 0 & 1 & 0 \end{bmatrix} - 8\begin{bmatrix} 0 & 1 & 1 & 1 \\ 1 & 0 & 1 & 1 \\ 1 & 1 & 0 & 1 \\ 1 & 1 & 1 & 0 \end{bmatrix} = \begin{bmatrix} 0 & -2 & -4 & -8 \\ -2 & 0 & -4 & -8 \\ -4 & -4 & 0 & -6 \\ -8 & -8 & -6 & 0 \end{bmatrix}$$
$$K2 = 4$$

INITIAL VALUE ( -1 -1 -1 1 )

$i = 1$ : $\Sigma T1jVj = (0\ -2\ -4\ -8)(-1\ -1\ -1\ 1) = -2$
$\qquad V1 = -1 \qquad V = (-1\ -1\ -1\ 1)$ $i = 2$ : $\Sigma T2jVj = (-2\ 0\ -4\ -8)(-1\ -1\ -1\ 1) = -2$
$\qquad V2 = -1 \qquad V = (-1\ -1\ -1\ 1)$ $i = 3$ : $\Sigma T3jVj = (-4\ -4\ 0\ -6)(-1\ -1\ -1\ 1) = 2$
$\qquad V3 = 1 \qquad V = (-1\ -1\ 1\ 1)$ $i = 4$ : $\Sigma T4jVj = (-8\ -8\ -6\ 0)(-1\ -1\ 1\ 1) = 10$
$\qquad V4 = 1 \qquad V = (-1\ -1\ 1\ 1)$ $i = 1$ : $\Sigma T1jVj = (0\ -2\ -4\ -8)(-1\ -1\ 1\ 1) = -10$
$\qquad V1 = -1 \qquad V = (-1\ -1\ 1\ 1)$ $i = 2$ : $\Sigma T2jVj = (-2\ 0\ -4\ -8)(-1\ -1\ 1\ 1) = -10$
$\qquad V2 = -1 \qquad V = (-1\ -1\ 1\ 1)$

F I G. 4D

| NEURON COEFFICIENT | A | B | C | D |
|---|---|---|---|---|
| K1 = 2, K2 = 0.5 | -0.99 | -0.99 | -0.92 | 0.75 |
| K1 = 2, K2 = 1 | -0.99 | -0.98 | -0.85 | 0.83 |
| K1 = 2, K2 = 2 | -0.97 | -0.90 | -0.33 | 0.91 |
| K1 = 2, K2 = 4 | -0.90 | -0.80 | 0.75 | 0.99 |

FIG. 6

| CYCLE | NEURON COEFFICIENT | A | B | C | D |
|---|---|---|---|---|---|
| 1 | K1=2, K2=0.5 | -0.2 | 0.1 | 0.1 | 0.2 |
| 2 | K1=2, K2=1 | -0.3 | 0.1 | 0.15 | 0.25 |
| 3 | K1=2, K2=2 | -0.4 | -0.05 | 0.15 | 0.3 |
| ⁓ | ⁓ | ⁓ | | | |
| n | K1=2, K2=$2^{n-2}$ | -0.6 | -0.5 | 0.5 | 0.6 |
| ⁓ | ⁓ | ⁓ | | | |
| CONVERGED STATE | K1=2, K2=$2^{n-2}$ | -1 | -1 | 1 | 1 |

FIG. 8

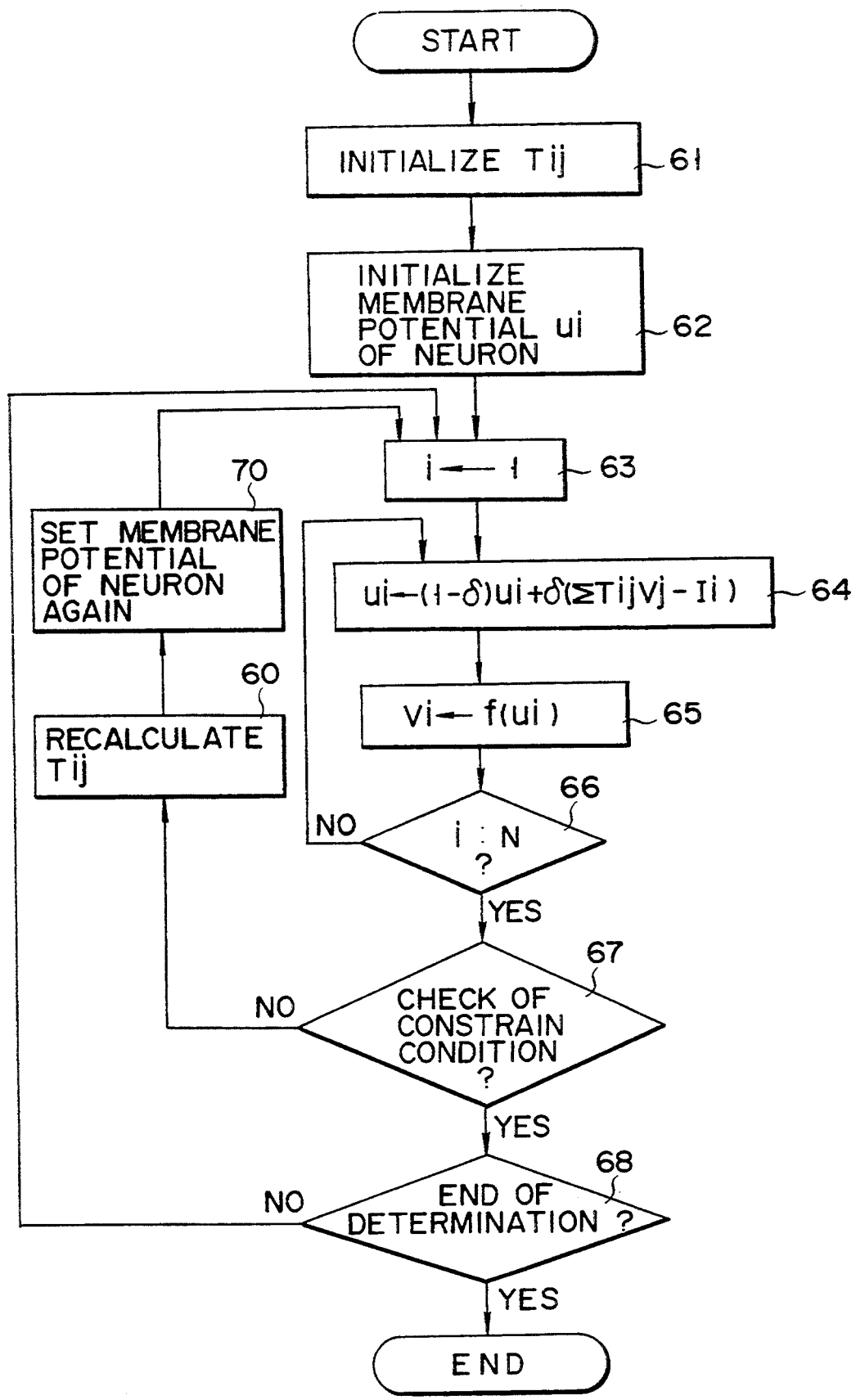
F I G. 7

NEURAL NETWORK WHICH USES A MONITOR

BACKGROUND OF THE INVENTION

1. Field of the Invention

The present invention relates to a neural network for efficiently solving combination optimization problems.

2. Description of the Related Art

In recent years, as a method of realizing an information processing capability resembling a man's right brain, a neural network has received a great deal of attention. The neural network models upon neurons and is constituted by a large number of artificial neurons connected to each other. These artificial neurons weight input signals, calculate a total sum of the weighted input signals, and generate an output by processing the total sum in accordance with a nonlinear function.

In a general neural network, a processor is assigned to the artificial neurons, subtracts a predetermined value from the input weighted sum signal, and outputs a function value as a result of subtraction. Note that neurons which process an analog value have a membrane potential. Artificial synapses constituted by multipliers are connected to the neurons, respectively. These synapses have connection weights between pairs of neurons. Each synapse multiplies the input signal with its own weighting and outputs the product to the neurons connected to itself.

The above neural network is said to be suitable for solving combination optimization problems. The combination optimization problems are raised to determine various methods which result in minimum costs under predetermined conditions. The combination optimization problems are exemplified by Traveling-Salesman Problems (i.e., a problem for determining a minimum distance of one salesman who travels through n cities), and LSI layout problems (i.e., a problem for determining a minimum number of cuts in a circuit division).

In order to solve the combination optimization problems using neural networks, a Hopfield technique is generally employed. This technique is disclosed in J. J. Hopfield, Neural Networks Physical System with Emergent Collective Computation Abilities, Proceedings of the National Academy of Sciences, vol. 79, pp. 2554–2558, 1982, and J. J. Hopfield, Neuron with Graded Response Have Collective Computational Properties like Those of Two-State Neurons, Proceedings of the National Academy of Sciences, vol. 81, pp. 3088–3092, 1984.

In order to solve each combination optimization problem using a neural network in accordance with the Hopfield technique, weightings obtained by an energy function are respectively designated for a plurality of artificial synapses, and the neural network performs repeated computation. This repeated computation allows the neural network to converge to a given state. If the converged state is not appropriate, the parameter within the energy function is adjusted, so that computation continues until the neural network is converged to an optimal state while a weighting value is continuously changed. According to this conventional method, since the parameter value within the energy function cannot be predetermined, a large volume of computation is required to determine the optimal weighting, and solutions for optimization problems cannot be efficiently derived.

SUMMARY OF THE INVENTION

It is an object of the present invention to provide a neural network for efficiently determining weighting coefficients between neurons (i.e., coefficients corresponding to evaluation function and constrain condition) and deriving solutions for optimization problems.

According to the present invention, a neural network for determining weightings between neurons in accordance with an energy function represented in the form of a sum between constrain and evaluation functions includes a monitor circuit for monitoring output values from neurons and a weighting calculation circuit for changing weightings between the neurons in accordance with an output from the monitor circuit.

The monitor circuit monitors the output values from the neurons. When a distribution of the output values is set in an unsatisfactory state which does not satisfy a constrain condition, the monitor circuit transmits information representing this state to the weighting calculation circuit. Every time the weighting calculation circuit receives this information, it doubles a coefficient corresponding to the constrain condition, thereby changing a weighting relationship between the neurons.

The neural network according to the present invention has a function of dynamically changing weightings between the neurons in accordance with the distribution of output values from the neurons.

In order to express the energy function in the form of a sum of the constrain condition and evaluation function to obtain weightings between the neurons, for example, a coefficient corresponding to the constrain condition is initially set to be smaller than that of the evaluation function. When the distribution of the output values from the neurons converges to an unsatisfactory state, the coefficient corresponding to the constrain condition is increased to obtain output values from the neurons again. This operation is repeated until the distribution of output values from the neurons converges to a satisfactory state.

According to the present invention, therefore, precise solutions are derived with a certain degree of freedom wherein the constrain condition is initially set to be coarse. The constrain condition is gradually restricted to obtain satisfactorily precise solutions which satisfy the resultant constrain condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing a combination optimization problem for dividing a circuit into two parts;

FIG. 2 is a schematic diagram showing a neural network according to the present invention;

FIGS. 4A, 4B, 4C and 4D are views showing a computation example for dividing a graph into two parts according to an embodiment of the present invention;

FIG. 6 is a view showing numeric values according to the flow chart of FIG. 5;

FIG. 7 is a processing flow chart of another deterministic continuous model according to the present invention; and FIG. 8 is a view showing numeric values in the processing according to the flow chart in FIG. 7.

DETAILED DESCRIPTION OF THE PREFERRED EMBODIMENTS

Figure 3:
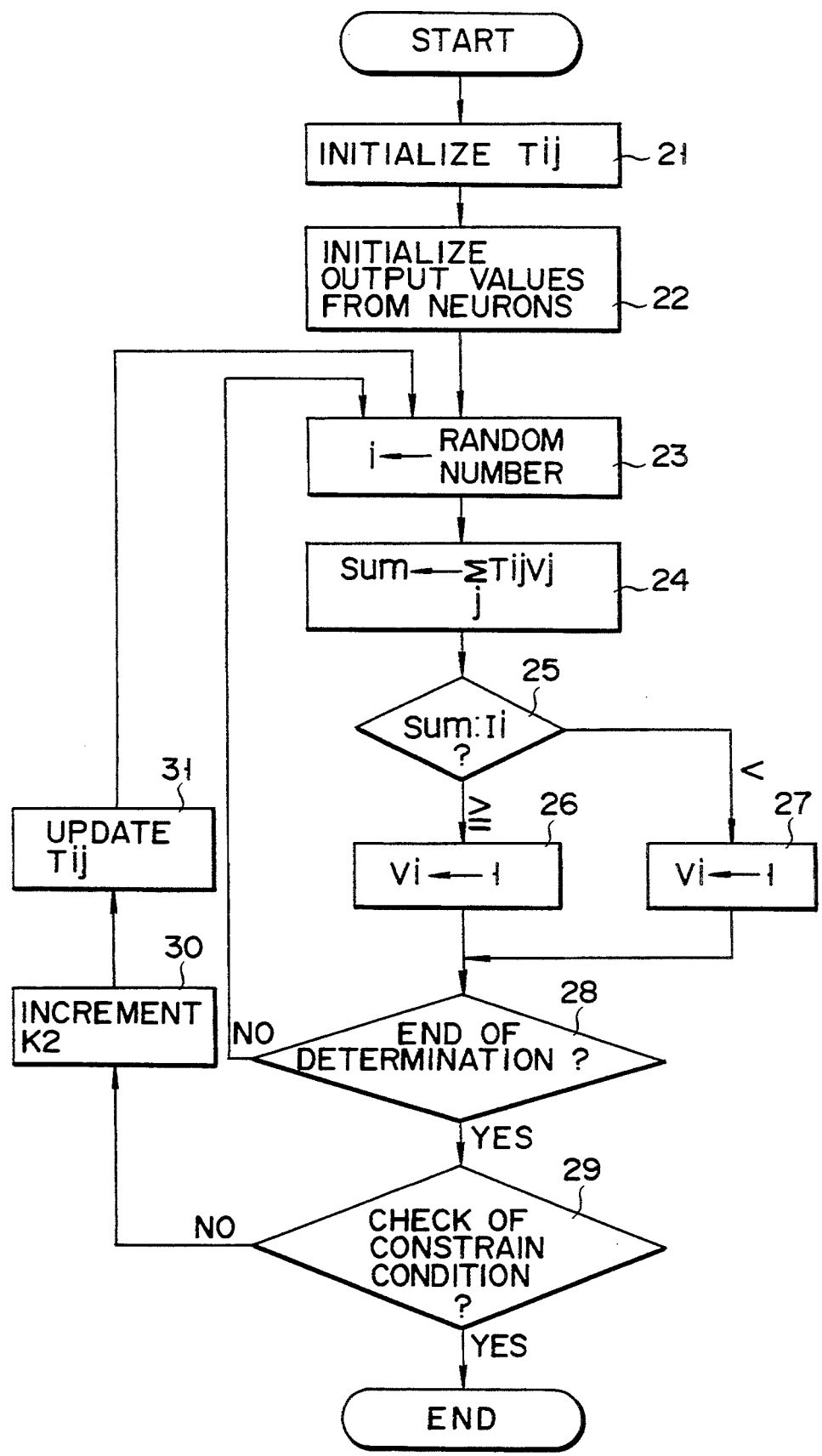
FIG. 3 is a processing flow chart of a probabilistic discrete model according to the present invention.

A Hopfield technique will be described prior to a description of a preferred embodiment of the present invention.

Methods of simulating the Hopfield technique in a computer include a probabilistic discrete model for processing digital values and a deterministic continuous model for processing analog values.

In the probabilistic discrete model, an output value of each neuron is generally set to be one of two values, i.e., "1" or "0". A neuron which is probabilistically sampled determines its output value in accordance with the following equation:

$$V_j = f\left(\sum_i T_{ij} V_i - I_i\right)$$

$$f(x) = 1 : x > 0$$
$$\phantom{f(x) =\ } 0 : x < 0$$

where $V_i$ is the output value of a neuron i, $T_{ij}$ is the weighting between the neurons i and j, and $I_i$ is the external input to the neuron i.

In the deterministic continuous model, an output value from each neuron is set to be any value between 1 and 0. All neurons calculate their output values in accordance with the following equation:

$$\frac{du_i}{dt} = K\left(\sum_j T_{ij} V_j - I_i - u_i\right)$$

$$V_i = f(u_i)$$

where $u_i$ is the membrane potential of the neuron i, f is the monotonic increment function (generally, a sigmoid function), and K is a constant.

In either model, it is known that the neural network as a whole converges toward a minimum energy value represented as follows:

$$F = -\tfrac{1}{2}\Sigma\Sigma T_{ij}V_iV_j + \Sigma I_i V_i \tag{1}$$

Values $T_{ij}$ and $I_i$ are obtained from the above equation to obtain a solution for the optimization problem.

A problem for dividing a graph, i.e., a circuit (FIG. 1) into two parts will be exemplified. This problem is associated with a basic algorithm for determining the layout of an LSI and corresponds to an operation wherein a circuit is divided into two parts to minimize the number of connecting lines cut to obtain the two parts. Each node in the graph corresponds to a module constituting the circuit, and a link of the graph corresponds to a connection between the modules. Assume that an area $S_x$ is given to each node x of the graph, and that the number of links between a node x and a node y is given as a connection count $C_{xy}$. In addition, assume that connection counts between the node x and external portions are given as $U_x$ and $L_x$ in correspondence with external pins of the LSI, and that the circuit is horizontally divided into upper and lower parts. The connecting count $U_x$ represents the number of connections between each node and the upper end, and the connecting count $L_x$ represents the number of connections between each node and the lower end.

In this case, the probabilistic discrete model is used. Each artificial neuron generates an output "1" or "−1" and is assigned to one node. That is, if an output from the neuron $v_x$ is 1, then the node x belongs to the upper side. However, if the output from the neuron $v_x$ is −1, the node x belongs to the lower side.

The energy function of this problem can be represented as follows:

$$F = \frac{K_1}{2}\sum_x\sum_y C_{xy}(1 - V_xV_y) + K_2(\Sigma S_y V_x)^2 + \frac{K_3}{2}\sum_x [U_x(1 - V_x) + L_x(V_x + 1)] \tag{2}$$

The first term on the right-hand side of equation (2) is a term representing a cut count obtained when the circuit is divided into two parts. This term takes a value of 0 for $V_xV_y=1$ (i.e., $V_x$ and $V_y$ belong to the same group). when $V_xV_y=-1$ (i.e., $V_x$ and $V_y$ belong to different groups), the value $C_{xy}$ represents a cut count between the nodes x and y. This term represents a total sum of cut counts.

The second term on the right-hand side represents a square of a difference between the areas of two groups. If the area of one group is equal to that of the other group, this term represents 0.

The third term on the right-hand side is a term representing a cut count when the circuit is connected to the external pins.

If $V_x=1$, the node is determined to belong to the upper side. However, if $V_x=-1$, the node is determined to belong to the lower side. The following relation represents a cut count obtained upon connection between the lower end and a module belonging to the lower group:

$$\tfrac{1}{2}U_x(1-V_x)$$

The following relation represents a count obtained upon connection between the lower end and a module belonging to the upper group:

$$\tfrac{1}{2}L_x(V_x+1)$$

The circuit is preferably divided to minimize the value derived from equation (2). Equation (2) can be rewritten as follows:

$$F = -\tfrac{1}{2}\sum_x\sum_y (K_1 C_{xy} - 2K_2 S_x S_y)V_x V_y + \sum_x \frac{K_3}{2}(U_x - L_x)V_x + [\text{Constant Term}]$$

The coefficients of the above equation are compared with those of equation (1) to derive the weighting $T_{xy}$ and the external input $I_x$ as follows:

$$T_{xy} = K_1 C_{xy} - 2K_2 S_x S_y \atop I_x = -\frac{K}{2}(U_x - L_x)} \quad (3)$$

The above equations can be expressed by the Hopfield model. $K_1$, $K_2$, and $K_3$ in the above equations are constants. More specifically, the constants $K_1$ and $K_3$ correspond to the evaluation function, and the constant $K_2$ corresponds to the constrain condition of equal areas.

Referring to FIG. 1, the graph is constituted by four nodes A, B, C, and D. Assume that the area of each of the nodes A, B, C, and D is given a value of 1, and the nodes have connecting strength values as marked in FIG. 1. If no external parts are connected to these nodes, the weighting between the neurons to divide this graph into two parts is defined from equations (3) as follows:

$$[T_{ij}] = K_1 \begin{bmatrix} 0&3&2&0 \\ 3&0&2&0 \\ 2&2&0&1 \\ 0&0&1&0 \end{bmatrix} - 2K_2 \begin{bmatrix} 0&1&1&1 \\ 1&0&1&1 \\ 1&1&0&1 \\ 1&1&1&0 \end{bmatrix} \quad (4)$$

In this case, the values of the constants $K_1$ and $K_2$ are appropriately set to solve the problem by using the neural network.

An embodiment based on the above Hopfield technique will be described with reference to FIG. 2.

N artificial neurons 11 are constituted by processors and are connected to $N^2$ artificial synapses 12. The synapses 12 have weightings between the artificial neurons.

The output terminals of the artificial neurons 11 are connected to the artificial synapses 12 and a monitor circuit 13. The monitor circuit 13 comprises, e.g., an adder for adding output values, e.g., 1s and −1s from the artificial neurons 11, and monitors whether the sums of 1s and −1s are given as, e.g., 2 vs. 2. The output terminal of the monitor circuit 13 is connected to a weighting calculation circuit 14. The weighting calculation circuit 14 calculates weightings from equations (3) using an output signal from the monitor circuit 13. More specifically, the monitor circuit 13 monitors the output values from the N artificial neurons 11 and supplies a control signal to the weighting calculation circuit 14 when a distribution of these output values converges into an unsatisfactory state (i.e., a state in which the constrain condition is not satisfied). Upon reception of this control signal, the weighting calculation circuit 14 increases a coefficient corresponding to the constrain condition (to be described later in detail) and calculates weightings between the neurons. The updated weightings are set in the artificial synapses 12 again. This weighting updating operation is repeated until the distribution of output values from the neurons 11 converges into a satisfactory state.

FIG. 3 is a flow chart executed when the present invention is applied to the probabilistic discrete model.

A weighting $T_{ij}$ to be assigned to each synapse 12 is initialized, and output values from the neurons 11 are initialized (steps 21 and 22). As described above, as a method of determining the value $T_{ij}$, the energy function is expressed in the form of a sum of constrain condition and evaluation function. A coefficient $K_2$ of the constrain condition is set to be smaller than a coefficient $K_1$ of the evaluation function to obtain an initial $T_{ij}$. A neuron i whose output value is to be obtained is determined by a random number (step 23). A weighted sum of initial output signals from all the neurons selected by the random number is obtained (step 24). The weighted sum is compared with an input signal $I_i$ externally supplied to the neuron i (step 25). If the sum is larger than the input value, the output value $v_i$ from the corresponding neuron i is set to be 1; otherwise, the output value $v_i$ is set to be −1 (steps 26 and 27). This processing is repeated in units of neurons. When a distribution of output values from all the neurons is kept unchanged, the neural network is determined to be converged, and the processing is determined to be ended (step 28). Whether the output values in this converged state satisfy the constrain condition is determined (step 29). If the answer is NO in step 29, the coefficient $K_2$ of the constrain condition is increased to calculate values $T_{ij}$ again, and the calculated coefficient values are set in the artificial synapses 12 again (steps 30 and 31). This processing is repeated until the distribution of output values from the neurons satisfies the constrain condition.

A processing example of the present invention will be described in accordance with the probabilistic discrete model using numeric values with reference to FIG. 4. When the graph shown in FIG. 1 is to be divided into two parts, computation is started after the coefficient $K_2$ is set to be smaller than the coefficient $K_1$. When the output values converge, it is determined whether their distribution satisfies the constrain condition. If it does not, computation is started again in accordance with the weightings $T_{ij}$ each of which is twice the initial weighting value, and processing of the neural network is repeatedly performed. More specifically, as shown in FIG. 4A, weightings $T_{ij}$ are calculated for $K_1=2$ and $K_2=0.5$. Computation is started on the basis of these weightings. As in FIG. 2, this computation is repeated seven times, and output signals from the neurons converge to $V=(-1, -1, -1, 1)$. That is, the four nodes A, B, C, and D are divided into two groups, i.e., a group consisting of A, B, and C, and a group consisting of only D.

This converged state does not satisfy the constrain condition that the graph is equally divided into two parts. In this case, the monitor circuit 13 determines an unsatisfactory state and outputs a control signal to the weighting calculation circuit 14. The weighting calculation circuit 14 calculates the weightings $T_{ij}$ for $K_2=1$ again, as shown in FIG. 4B, and sets the resultant weightings in the synapses again. Output signals from the neurons are calculated in the neural network while the initial value of the output signals in the converged state in FIG. 4A is given as $V=(-1, -1, -1, 1)$. The computation is repeated four times, and the converged output value is given as $v=(-1, -1, -1, 1)$, which is not changed from the state in FIG. 4A. The weighting calculation circuit 14 then recalculates the weightings $T_{ij}$ for $K_2=2$, as shown in FIG. 4C, and sets the resultant weightings in the synapses. Output signals from the neurons are continuously processed while the output signals in the converged state in FIG. 4B is given as $V=(-1, -1, -1, 1)$. This computation is repeated four times but the converged value is not changed. The weighting calculation circuit 14 recalculates the weightings for $K_2=4$ in FIG. 4D, and similarly calculation processing continues. The computation is repeated six times to obtain a converged value $V=(-1, -1, 1, 1)$. This converged value represents that the graph is divided into two groups, i.e., a group consisting of A and B, and a group consisting of C and D, and satisfies the constrain condition. In this case, a connecting line cut count of the divided parts is also given as a minimum value of 4.

A more precise solution which satisfies the constrain condition is obtained by gradually increasing the value of the coefficient $K_2$.

The processing of the probabilistic discrete model has been described. However, similar operations can be performed in the deterministic continuous model.

In this case, an arrangement of a neural network is the same as that in FIG. 2, but each neuron i has its own membrane potential $u_i$. Each synapse multiplies an output $V_j$ of the corresponding neuron with its own weighting $T_{ij}$ and sends this product to the corresponding neuron $V_i$.

The neuron $V_i$ receives a total sum of synapse calculations, i.e., $$\sum_{j=1}^{n} T_{ij}V_j$$

and the external input signal $I_i$, changes its own membrane potential $v_i$ on the basis of the input values, and determines an output value in accordance with the updated membrane potential.

Figure 5:
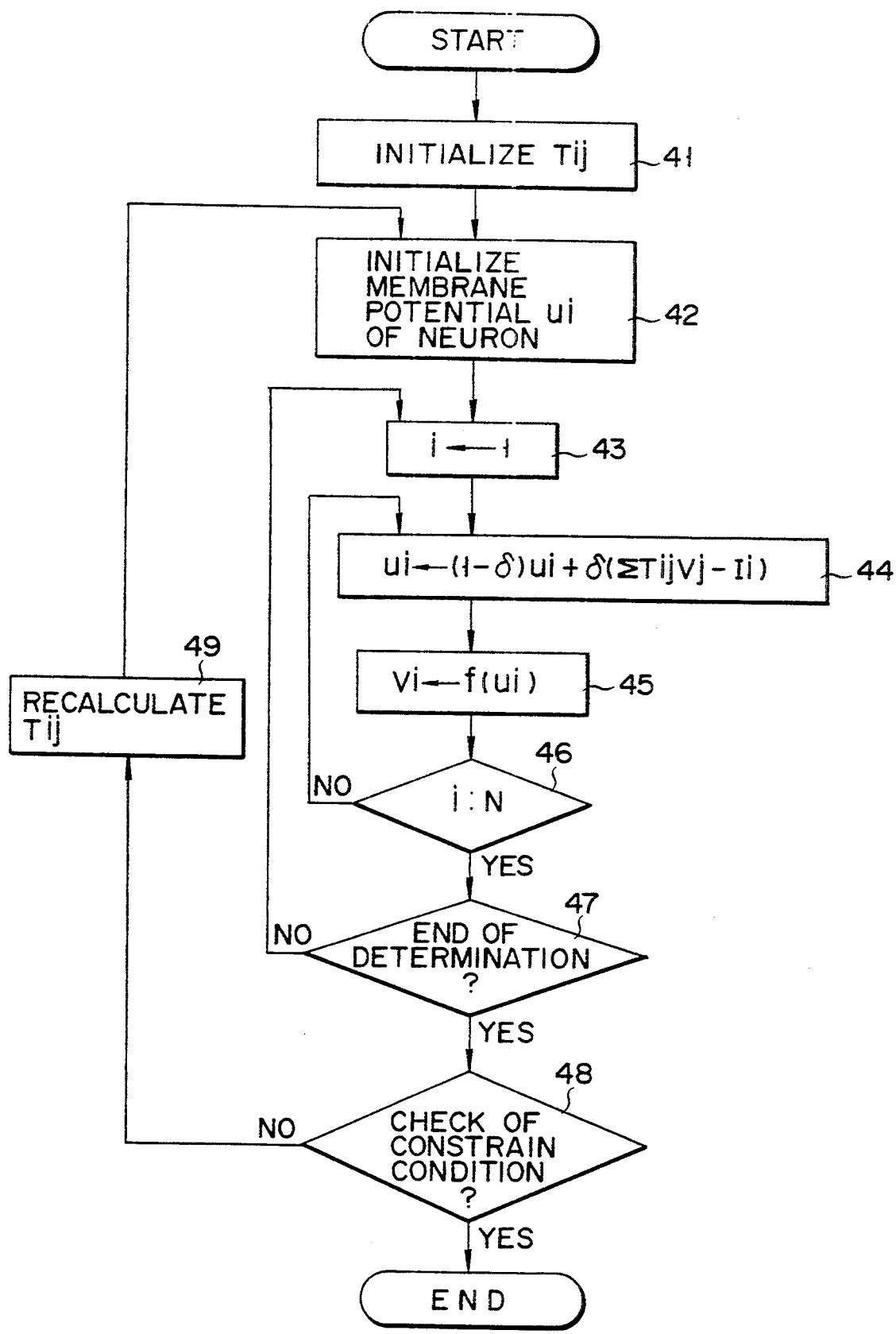
FIG. 5 is a processing flow chart of a deterministic continuous model according to the present invention.

According to the present invention, as in the probabilistic discrete model, a monitor circuit 13 and a weighting calculating circuit 14 are arranged, and a processing sequence is as shown in a flow chart of FIG. 5. More specifically, the weighting $T_{ij}$ of each synapse is initialized, and at the same time the membrane potential of each neuron is initialized (steps 41 and 42). The first neuron is designated, and the membrane potential of this neuron is changed on the basis of the total sum of synapse calculations, i.e., $$\sum_{j=1}^{n} T_{ij}V_j$$

and the input signal $I_i$ (steps 43 and 44). A rate of change in membrane potential is obtained by the Eulerian method as follows:

$$\frac{du_i}{dt} = K(\Sigma T_{ij}V_{ij} - I_i - u_i)$$

Therefore, the updated membrane potential $U_i$ is represented by the following relation:

$$u_i \leftarrow (1-\delta)u_i + \delta(\Sigma T_{ij}V_j - I_i)$$

The output signal $V_i$ can be obtained by processing the updated membrane potential by a corresponding function (step 45). This processing is performed for all, i.e., N neurons (step 46). When all the output signals converge while this processing is repeated several times (i.e., when a difference between the present output signal and the immediately preceding output signal is almost zero), it is determined whether the converged result satisfies the constrain condition (steps 47 and 48).

If it does not, the coefficient $K_2$ is increased by the weighting calculation circuit 14 as in the probabilistic discrete model, the weightings $T_{ij}$ are recalculated, and the resultant weightings $T_{ij}$ are then set in the synapses again (step 49). The processing from step 42 is repeated again. If the resultant converged value distribution satisfies the constrain condition by this repetition, processing is ended.

FIG. 6 shows numeric values obtained by processing the deterministic continuous model in accordance with the flow chart in FIG. 5. The division of the graph in FIG. 1 into two parts is analyzed as a combination optimization problem. Weightings $T_{ij}$ for the coefficient $K_2=0.5$ of the constrain condition with respect to the coefficient $K_1=2$ of the evaluation function are initially set. The membrane potentials of the neurons A to D are sequentially changed to generate output signals $V_i$. This processing is repeated several times. When a difference between the present output signal from each neuron and the immediately preceding output signal therefrom is almost zero, the output values are determined to be converged, and the end of processing is determined. In this case, the output signals are given as $VA=-0.99$, $VB=-0.99$, $VC=-0.92$, and $VD=0.75$, as shown in FIG. 6. These output values are one positive value and three negative values, and therefore these output signals do not satisfy the constrain condition. Therefore, the weighting calculation circuit 14 recalculates weightings $T_{ij}$ for $K_2=1$ for the second time, and the resultant weightings are set in the synapses again.

Even if the above processing is performed, the converged values are one positive value and three negative values and do not satisfy the constrain condition. The weighting calculation circuit 14 recalculates weightings $T_{ij}$ for $K_2=2$ for the third time, and the resultant weightings are set in the synapses again. Even if this processing is performed, the converged values are still one positive value and three negative values, and do not satisfy the constrain condition (in this case, the converged value of the neuron C is $-0.33$ which is close to a positive value, and it is apparent that an effect of an increase in $K_2$ is enhanced). When the weighting calculation circuit 14 calculates weightings $T_{ij}$ for $K_2=4$, the resultant converged values are two positive values and two negative values, thus satisfying the constrain condition. The graph is thus divided into two groups, i.e., a group consisting of A and B and a group consisting of C and D. A connecting line cut count is given as 4.

As a modification of the embodiment which processes the deterministic continuous model, a method of checking whether a constrain condition is satisfied when output values from neurons do not converge may be proposed. This will be described with reference to a flow chart in FIG. 7 below.

When the absolute value of an output signal from each neuron is a predetermined value or more, its converged value may be predicted. On the basis of this finding, an output value of each neuron in each calculation cycle is monitored by a monitor circuit. A weighting $T_{ij}$ of each synapse is initialized, and a membrane potential of each neuron is initialized (steps 61 and 62). The membrane potential of the first neuron is changed in accordance with a total sum $\Sigma T_{ij}V_j$ of synapse calculations and an input signal $I_i$ (steps 63 and 64). An output value is obtained by processing the updated membrane potential by a corresponding function (step 65). This processing is sequentially performed for all neurons (step 66). The above operations are the same as those in the flow chart in FIG. 4. The monitor circuit 13 then checks whether all the output values of the neurons satisfy the constrain condition (step 67). If not, the coefficient $K_2$ of the constrain condition is increased, and weightings $T_{ij}$ are recalculated, and the resultant weightings are set in the synapses again (step 68). In this case, the membrane potential of each neuron is initialized (step 69). For example, the present membrane potential $u_i$ is reduced by $\frac{1}{2}$. According to this method, higher convergence efficiency can be obtained when an influence of the present state is left in each neuron rather than initialization of the membrane potential $u_i$ to about zero. The operations in steps 63 to 66 are repeated, and the output values of all the neurons are obtained for the second time. In this sate, the constrain condition is checked again. If the constrain condition is not satisfied, the coefficient $K_2$ of the constrain condition is further increased to calculate new weightings $T_{ij}$. The membrane potentials of the neurons are set by the weightings $T_{ij}$ again, and the above processing is performed. When the output values of all the neurons for the nth time satisfy the constrain condition and the absolute values of the output values exceed a predetermined value, processing in steps 63 to 67 is performed without changing the weightings $T_{ij}$ and the membrane potential (step 70). These operations are repeated to obtain a final output of each neuron to be 1 or −1, thereby ending the processing.

A processing example using numeric values of this embodiment will be described with reference to FIG. 8.

Weightings $T_{ij}$ for $K_1=2$ and $K_2=0.5$ are calculated as initial values. At this time, outputs VA$=-0.2$, VB$=0.1$, VC$=0.1$, and VD$=0.2$ of all the neurons are obtained for the first time. These output values do not satisfy the constrain condition. Weightings $T_{ij}$ for $K_1=$ and $K_2=1$ are calculated to obtain output values of all the neurons for the second time, but the output values do not yet satisfy the constrain condition. The above processing is repeated to obtain outputs of all the neurons for the nth time as VA$=-0.6$, VB$=-0.5$, VC$=0.5$, and VD$=0.6$. These output values satisfy the constrain condition, and their absolute values are equal to or larger than the predetermined threshold value of 0.5. Even if the weightings $T_{ij}$ are kept changed, it is expected that the output values will converge to 1 and −1. Thereafter, output processing of all the neurons is performed without changing the coefficients $K_1$ and $K_2$, and the output values are changed to a final converged state.

In this example, the monitor circuit monitors the output signals from all the neurons in each operation cycle. However, a predetermined time interval may be set, and the output signals may be monitored at predetermined time intervals.

According to the present invention, the coefficient $K_2$ of the constrain condition is initially set to be smaller than the coefficient $K_1$ of the evaluation function and is gradually increased. However, the coefficient $K_2$ may be initially set to be larger than the coefficient $K_1$ and may be gradually decreased. In this case, solutions which satisfy the constrain condition in several initial operation cycles are obtained since the constrain condition is restricted. When a solution which does not satisfy the constrain condition is obtained, the immediately preceding solution which satisfies the constrain condition may be selected. In this case, the constrain condition range is gradually widened. Therefore, the immediately preceding solution which satisfies the constrain condition is a relatively highest evaluation function value. That is, a solution obtained immediately before the output values of the neurons are changed from 2 vs. 2 to 3 vs. 1 or from 3 vs. 1 to 2 vs. 2 has a high evaluation function value.

As has been described above, according to the present invention, the monitor circuit monitors the output values of the neurons, and the weighting calculation circuit dynamically changes the weightings between the neurons. In particular, as a method of changing weightings, the coefficient of the constrain condition for the combination optimization problem is sequentially changed. Therefore, since a solution which has satisfactory quality and satisfies the constrain condition can be efficiently obtained, practical advantages in solving the combination optimization problems by using the neural network can be greatly improved.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A neural network applied to an optimization problem comprising:
    a plurality of artificial neurons for outputting signals which respectively correspond to a plurality of input signals;
    a plurality of artificial synapses for setting weighting values which correspond respectively to each of said artificial neurons according to output signals which are output from said artificial neurons, and for respectively outputting said set weighting values to each of the corresponding artificial neurons;
    monitor means for determining whether said output signals satisfy a constrain condition which corresponds to a desired result to be output by said neurons when the output signals from said artificial neurons become substantially constant and for outputting a control signal if said output signals do not satisfy the constrain condition; and
    weighting calculating means for changing weightings of said artificial synapses which respectively correspond to said artificial neurons in accordance with said control signal output from said monitor means whereby said monitor means outputs said control signal to said weighting calculating means if said output signals from said artificial neurons do not satisfy the constrain condition.

2. A network according to claim 1, wherein said monitor means comprises means for determining whether the output signals from said artificial neuron satisfy the constrain condition every time the output signals from said artificial neurons are obtained.

3. A neuron network applied to an optimization problem comprising:
    N neurons for outputting digital signals respectively corresponding to input signals;
    $N^2$ synapses, including N synapses respectively connected to said N neurons, for multiplying the digital signals output from said N neurons with weightings corresponding to output source neurons and connection destination neurons and for outputting products to said connection destination neurons;

monitor means for determining whether the digital signals satisfy a constrain condition which corresponds to a desired result to be output by said neurons when the digital signals from said N neurons become substantially constant and for outputting a control signal if the digital signals do not satisfy the constrain condition; and weighting calculating means for changing the weightings corresponding to said output source neurons and said connection destination neurons of said synapses in response to the control signal from said monitor means in order to satisfy the constrain condition whereby said monitor means outputs said control signal to said weighting calculating means if said output signals from said artificial neurons do not satisfy the constrain condition.

4. A network according to claim 3, wherein said neuron compares a sum of the products input from said N synapses connected to said neuron with an input signal and outputs a digital signal of 1 or −1 in accordance with a comparison result.

5. A network according to claim 3, wherein each of said $N^2$ synapses multiplies an output signal of a corresponding neuron with a corresponding weighting value assigned to each synapse and then outputs the product to said corresponding neuron for random output to a corresponding one of said connection destination neurons.

6. A neural network applied to an optimization problem comprising:

means for inputting a plurality of signals;

N neurons, having membrane potentials which change with changing input signals according to a predetermined function, for outputting analog signals;

$N^2$ synapses, including N synapses respectively connected to said N neurons, for multiplying the analog signals output from said N neurons with weightings corresponding to output source neurons and connection destination neurons and for outputting products to said connection destination neurons;

monitor means for determining whether the analog signals satisfy a constrain condition which corresponds to a desired result to be output by said neurons when the signals output from said N neurons become substantially constant, and for outputting a control signal if the analog signals do not satisfy the constrain condition; and weighting calculating means for changing the weightings corresponding to said output source neurons and said connection destination neurons of said synapses in response to the control signal from said monitor means in order to satisfy the constrain condition, and for initializing the membrane potentials of said neurons whereby said monitor means outputs said control signal to said weighting calculating means if said output signals from said artificial neurons do not satisfy the constrain condition.

7. A network according to claim 6, wherein said monitor means comprises means for determining whether the output signals from said N neurons satisfy the constrain condition at a plurality of predetermined time intervals.

8. A network according to claim 6, wherein said weighting calculating means comprises means for setting the membrane potential to about ½ the membrane potential at the time of initialization when the membrane potential of said neuron is initialized.

9. A network according to claim 1, 3, or 6, wherein said weighting calculating means expresses a given combination optimization problem in the form of a sum of the constrain condition and a given evaluation function, and determines a weight of said synapses by comparing an energy function using neuron output as a variable with a function expressed by Hopfield model.

10. A network according to claim 9, wherein said weighting calculating means comprises means for starting calculating weightings of said synapses by using a coefficient corresponding to the evaluation function as an initial value set to be smaller than a coefficient corresponding to the constrain condition, and for gradually increasing the coefficient corresponding to the constrain condition upon every input of a signal supplied from said monitor means.

11. A network according to claim 10, wherein said monitor means comprises means for determining whether the output signals from said N neurons satisfy the constrain condition every time the weightings of said synapses are changed and the output signals from said N neurons become substantially constant, and for determining N output signals which satisfy the constrain condition for the first time as a solution.

12. A network according to claim 9, wherein said weighting calculating means comprises means for starting weighting calculation of said synapses by using a coefficient corresponding to the evaluation function as an initial value set to be larger than a coefficient corresponding to the constrain condition, and for gradually decreasing the coefficient corresponding to the constrain condition for each of a pluraliut of control signals supplied from said monitor means.

13. A network according to claim 12, wherein said monitor means comprises means for determining whether the output signals from said N neurons satisfy the constrain condition every time the weightings of said synapses are changed and the output signals from said N neurons become substantially constant, and for determining as a solution N output signals immediately preceding output signals which do not satisfy the constrain condition for the first time.

14. A network according to claim 6, wherein each of said $N^2$ synapses multiplies an output signal of a corresponding neuron with a corresponding weighting value assigned to each synapse and then outputs the product to said corresponding neuron for random output to a corresponding one of said connection destination neurons.

15. A neural network applied to an optimization problem comprising:

a plurality of artificial neurons for outputting signals which respectively correspond to a plurality of input signals;

a plurality of artificial synapses for setting weighting values which correspond respectively to each of said artificial neurons according to output signals which are output from said artificial neurons, and for respectively outputting said set weighting values to each of the corresponding artificial neurons;

monitor means for determining whether the output signals satisfy a constrain condition which corresponds to a desired result to be output by said neurons when the output signals from said artificial neurons become substantially constant, and for outputting a control signal if said output signals do not satisfy the constrain condition; and weighting calculating means for changing weightings of said artificial synapses which respectively correspond to said artificial neurons in accordance with said control signal output from monitor means whereby said monitor means outputs said control signal to said weighting calculating means if the output signals from said artificial neurons do not satisfy the constrain condition.

* * * * *